United States Patent
Billich et al.

(10) Patent No.: US 12,338,841 B2
(45) Date of Patent: Jun. 24, 2025

(54) HYDRAULIC ARRANGEMENT AND UTILITY VEHICLE

(71) Applicant: DEERE & COMPANY, Moline, IL (US)

(72) Inventors: Manuel Billich, Dornstadt (DE); Michael Meid, Waghaeusel (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/812,274

(22) Filed: Aug. 22, 2024

(65) Prior Publication Data

US 2025/0084873 A1    Mar. 13, 2025

(30) Foreign Application Priority Data

Sep. 13, 2023 (DE) .......................... 102023124710.7
Sep. 13, 2023 (DE) .......................... 102023124711.5

(51) Int. Cl.
| | |
|---|---|
| *F15B 11/17* | (2006.01) |
| *B60R 16/08* | (2006.01) |
| *B60T 17/22* | (2006.01) |
| *B62D 5/32* | (2006.01) |

(52) U.S. Cl.
CPC .............. *F15B 11/17* (2013.01); *B60R 16/08* (2013.01); *B60T 17/221* (2013.01); *B62D 5/32* (2013.01); *B60T 2270/413* (2013.01)

(58) Field of Classification Search
CPC ............ F15B 11/17; F15B 2211/20553; F15B 11/165; F15B 11/0423
See application file for complete search history.

(56) References Cited

U.S. PATENT DOCUMENTS

| | | | |
|---|---|---|---|
| 6,321,535 B2 | 11/2001 | Ikari et al. | |
| 9,850,885 B2 | 12/2017 | Sakamoto | |
| 11,767,860 B2 * | 9/2023 | Klopfenstein | F15B 11/17 60/327 |
| 2012/0233993 A1 | 9/2012 | Vigholm et al. | |

FOREIGN PATENT DOCUMENTS

| | | | | |
|---|---|---|---|---|
| AT | 524855 B1 | 10/2022 | | |
| DE | 4108915 C2 | 8/2002 | | |
| EP | 3848592 A1 | 7/2021 | | |
| EP | 3913232 A1 * | 11/2021 | ............ | E02F 9/2075 |
| EP | 4187107 A1 | 5/2023 | | |

OTHER PUBLICATIONS

European Search Report issued in application No. 24191645.1, dated Jan. 8, 2025, 19 pages.
European Search Report issued in application No. 24191646.9, dated Jan. 27, 2025, 17 pages.

* cited by examiner

Primary Examiner — Abiy Teka

(57) ABSTRACT

A hydraulic arrangement for a utility vehicle. The arrangement may include a hydraulic displacement pump which is connected via a pump output to a supply connection as a hydraulic interface for supplying hydraulic consumers of the utility vehicle. In addition, the device may include a hydraulic auxiliary pump and an auxiliary supply connection as a hydraulic interface for alternatively supplying at least some of the consumers. The device may include a displacement control unit which is dependent on an output pressure of the auxiliary pump for displacing the displacement pump in such a manner that a hydraulic working connection of a displacement cylinder of the displacement control unit is connected to an output of the auxiliary pump.

11 Claims, 4 Drawing Sheets

HYDRAULIC ARRANGEMENT AND UTILITY VEHICLE

CROSS-REFERENCE TO RELATED APPLICATIONS

This application claims priority to German Patent Application No. 102023124711.5, filed on Sep. 13, 2023, and to German Patent Application No. 102023124710.7, filed on Sep. 13, 2023, which are hereby incorporated by reference herein.

TECHNICAL FIELD

The present disclosure relates generally to a hydraulic arrangement for a utility vehicle and to a utility vehicle having such a hydraulic arrangement.

BACKGROUND

A hydraulic arrangement for a utility vehicle may include a hydraulic displacement pump for supplying hydraulic consumers of the utility vehicle.

SUMMARY

In tractors, variable displacement pumps may be used for supplying vehicle-internal or external hydraulic consumers (for example, in attachments). The displacement pump is driven, for example via a gear mechanism, by the drive motor of the utility vehicle or tractor. During a starting operation of the drive motor, the displacement control unit of the displacement pump is in many cases adjusted to an increased conveying position, e.g., for conveying an increased hydraulic quantity, which in some examples includes a maximum hydraulic quantity of the pump used. This requires a correspondingly high drive power of the drive motor. A cold start of the utility vehicle can additionally cause the power consumption of the displacement pump to increase as a result of the increased viscosity of the hydraulic medium.

A potential advantage of at least some embodiments of the present disclosure is to provide a hydraulic arrangement and a utility vehicle which reduces the power required for the displacement pump when the utility vehicle is started.

This advantage may be achieved by a hydraulic arrangement having the features of one or more embodiments disclosed herein and by a utility vehicle having the features of one or more embodiments disclosed herein.

Additional potential advantages of the hydraulic arrangement according to the disclosure and the utility vehicle according to the disclosure may be set out in the one or more embodiments disclosed herein.

There is proposed according to one or more embodiments disclosed herein a hydraulic arrangement for a utility vehicle which contains a hydraulic displacement pump. It is connected via a pump output to a supply connection as a hydraulic interface for supplying hydraulic consumers of the utility vehicle. The hydraulic arrangement further contains an auxiliary pump and an auxiliary supply connection as a hydraulic interface for alternatively supplying at least some of the hydraulic consumers (for example, a steering system and/or a brake system), for example in the event of an emergency in which the displacement pump fails. The displacement pump has a displacement control unit having a displacement cylinder. In this case, a hydraulic working connection of the displacement cylinder is hydraulically connected to an output of the auxiliary pump. This brings about a displacement control which is dependent on an output pressure of the auxiliary pump in order to displace the displacement pump.

The pump output or displacement pump output may be a hydraulic output directly at the displacement pump itself or may be in the form of a hydraulic output of a pump unit which contains the displacement pump. Similarly, the auxiliary pump output may also be a hydraulic output directly at the auxiliary pump itself or may be in the form of a hydraulic output of an auxiliary pump unit which contains the auxiliary pump.

In displacement pumps, the conveying quantity or the volume flow of the conveyed hydraulic medium (for example, oil) may be displaced not only by different drive speeds but also at a constant drive speed of the displacement pump. Different parameters are conceivable as manipulated variables, for example, a current hydraulic pressure. The respective manipulated variable(s) can influence a suitable displacement control unit which adjusts, for example continuously adjusts, the displacement pump with respect to the conveying quantity thereof.

The displacement control unit can be adjusted between a conveying position with an increased (e.g., maximum) conveying quantity and a conveying position with a reduced (e.g., minimum) conveying quantity. In this case, the already-mentioned hydraulic displacement cylinder is used.

With the hydraulic arrangement according to the disclosure, a potential technical advantage may be achieved in that the displacement control unit in the start phase of the drive motor of the utility vehicle is in a conveying position with a reduced conveying quantity or is adjusted into this conveying position. In the start phase of the drive motor, this brings about a conveying quantity which is at the lower end of the range, for example the lowest value of the range, of the displacement pump. The power consumption or the power requirement of the displacement pump can thereby be reduced, whereby the load on the drive motor and the starter motor, which drives it, of the utility vehicle in the start phase is relieved.

This physical state, which is desired in the start phase of the utility vehicle, of the displacement pump is supported according to the disclosure by the auxiliary pump. In this case, the activated auxiliary pump can supply a displacement pressure to the working connection of the displacement cylinder by the output pressure thereof so that the displacement cylinder adjusts the conveying position with a reduced conveying quantity (e.g., a smallest conveying quantity based on the physical characteristics of the device being used).

As one example, the desired displacement pressure for adjusting the reduced conveying quantity is for example dependent only on the characteristic of the displacement pump, for example the displacement cylinder thereof, and is for example less than 10 bar. Consequently, the displacement pump and, as a result, the drive motor and the starter motor of the utility vehicle can be supported in the start phase of the utility vehicle with little energy expenditure and low energy losses.

Hydraulic interfaces, such as, for example, the supply connection and the auxiliary supply connection, support a modular construction of the hydraulic arrangement for a technically simple integration in the utility vehicle. The hydraulic arrangement can have additional hydraulic interfaces, for example, a return connection for the return of hydraulic medium into a tank container or hydraulic tank. Via this return connection, for example, hydraulic medium can flow back out of the displacement cylinder into the hydraulic tank. Furthermore, a feedback connection which is active as an interface for a pressure feedback of consumers can be provided at the hydraulic arrangement.

For example, the displacement cylinder is in the form of a single-acting cylinder with a single hydraulic working connection, whereby the technical/hydraulic construction of the displacement control unit is kept technically simple.

In an example embodiment, a hydraulic non-return valve is connected upstream of the working connection in the throughflow path between the output of the auxiliary pump and the working connection of the displacement cylinder. In this case, the throughflow direction of the non-return valve is orientated in the direction of the displacement cylinder. It can thereby be achieved in a technically simple manner that an output pressure or displacement pressure which is built up by the activated or driven auxiliary pump at the working connection can be maintained for the displacement control unit.

In another example, a retention valve unit having at least two different switching positions is hydraulically connected in the hydraulic throughflow path between the working connection of the displacement cylinder, on the one hand, and a return connection and the pump output of the displacement pump, on the other hand. The return connection is used for the return of hydraulic medium to a tank container or hydraulic tank. Via this return connection, for example, hydraulic medium can flow back out of the displacement cylinder into the hydraulic tank.

The retention valve unit acts as a hydraulic interruption or as a hydraulic connection in the throughflow path depending on the activated switching position thereof. For example, the interruption effect of the retention valve unit can as a simple technical measure contribute to avoiding any leaks. The displacement pressure which is built up at the working connection of the displacement cylinder can be reliably maintained before the starting operation of the utility vehicle and where applicable also even during the starting operation.

The retention valve unit has, for example, an electromagnet for electrical actuation. This actuation is carried out for example by means of a suitable control unit. As one example, the switching position which acts as a hydraulic connection corresponds to a rest position of the retention valve unit.

In order to support the hydraulic functionality of the displacement control unit, the retention valve unit is for example constructed so that it has, in the throughflow path at the connection side thereof facing away from the working connection of the displacement cylinder, a hydraulic valve connection which can be connected to the pump output in accordance with an output pressure of the displacement pump. This can be achieved by the integration of at least one suitable distributing valve or proportional valve in the displacement control unit.

As another example, the retention valve unit contains a control pressure input which is active in the switching direction and which is hydraulically connected to the above-mentioned valve connection. For example, the control pressure input can be used to automatically activate the switching position, which acts as a hydraulic connection in the throughflow path, of the retention valve unit at an output pressure which increases at the valve connection. It is thereby possible to supply the displacement cylinder with increasing pressure and to automatically adjust the conveying position with the reduced conveying quantity. This automatic nature supports the hydraulic arrangement in the event of failures of the auxiliary pump so that, if the auxiliary pump fails, the adjustment of a reduced displacement or a reduced conveying quantity by the displacement cylinder is possible.

In an example embodiment, at least one valve unit which has a plurality of switching positions and which has two hydraulic control inputs which are opposite each other in the switching direction is provided in the throughflow path between the working connection or the retention valve unit, on the one hand, and a return connection and the pump output, on the other hand. The return connection is used for the return of hydraulic medium to a tank container or hydraulic tank. Via this return connection, for example, hydraulic medium can flow back out of the displacement cylinder into the hydraulic tank.

While one control input of the retention valve unit is hydraulically connected to the output of the displacement pump, the other control input is either hydraulically connected to the return connection or is hydraulically connected to a feedback connection which acts as an interface for a pressure feedback of consumers. As a result, the displacement control unit can be supported in a technically reliable manner.

In a potentially advantageous further example of the disclosure, the output pressure or displacement pressure at the output of the auxiliary pump can be compared with a predetermined desired pressure. This desired pressure for example corresponds to the pressure at the working connection of the displacement cylinder, at which the conveying position with the reduced conveying quantity is produced. Depending on the comparison result, for example, the operation of the auxiliary pump can then be controlled efficiently. The value of the desired pressure is generally dependent on the physical characteristic of the displacement pump, for example the displacement cylinder thereof.

For example, the hydraulic arrangement has at least one of the following states or at least one of the following features with an increasing output pressure or displacement pressure at the output of the auxiliary pump after reaching or exceeding the predetermined desired pressure:

- the retention valve unit is in the switching position thereof which acts as a hydraulic connection in the throughflow path.
- the drive of the auxiliary pump is reduced or deactivated. In this case, consideration is given to the fact that the displacement control unit of the displacement pump takes up the conveying position with a reduced conveying quantity after reaching or exceeding the predetermined desired pressure. Support by the auxiliary pump is then no longer required or is required only to a reduced extent.
- The displacement pump is driven. Since the predetermined desired pressure at the displacement cylinder has been reached or exceeded and consequently the conveying position with a reduced conveying quantity is adjusted, the displacement pump is driven with a reduced (e.g., smallest given the physical characteristics of the device being used) pump displacement and consequently with a low power consumption. The displacement pump is for example driven by the starting drive motor.

In an example embodiment, a pressure sensor which generates sensor signals is hydraulically connected to the output of the auxiliary pump. It is thereby possible to compare the current output pressure or displacement pressure of the auxiliary pump continuously with the predetermined desired pressure. As soon as the desired pressure is reached or exceeded, the auxiliary pump can be deactivated or reduced with respect to the conveying activity thereof. Reaching or exceeding the predetermined desired pressure at the output of the auxiliary pump can be detected in a technically simple and reliable manner by means of the pressure sensor.

The pressure sensor is connected, for example, to a control unit which processes the pressure sensor signals and inter alia compares them with the predetermined desired pressure. A drive or auxiliary pump motor (for example, electric motor) of the auxiliary pump can then be controlled by the control unit depending on the sensor signal. The control unit can where applicable also control other components, such as hydraulic valves, for example the retention valve unit, within the hydraulic arrangement. The control can be carried out in accordance with the pressure sensor signals and/or other signals or data (for example, speed of the drive motor, bus signals of a control and/or data bus of the utility vehicle).

The disclosure further relates to a utility vehicle, for example an agricultural or forestry towing vehicle (for example, a tractor or hauling vehicle) or a construction machine, having a drive motor and having a hydraulic arrangement according to one or more embodiments disclosed herein.

The utility vehicle according to the disclosure may have the above-described advantages of the hydraulic arrangement according to the disclosure. The hydraulic arrangement allows an efficient technical operation of the displacement pump before, during and after a starting operation of the drive motor of a utility vehicle. For example, during a cold start, conventional impairments in the start phase of the drive motor can be avoided. The hydraulic arrangement allows the load on the displacement pump and the drive motor to be relieved, for example in the event of a cold start with high viscosity of the hydraulic medium. The start operation of the utility vehicle can be carried out with a substantially lower power requirement, which also supports the technical sequence of a successful cold start.

The utility vehicle can have a drive motor for driving the displacement pump which is contained in the hydraulic arrangement.

For example, the auxiliary supply connection is hydraulically connected to a brake system and/or a steering system of the utility vehicle. Consequently, the technical prerequisites for a technically simple-to-produce emergency operation of the brake system and/or steering system are provided by the hydraulic arrangement according to the disclosure being able to be integrated in the utility vehicle in a modular manner and in this case the hydraulic interfaces of the arrangement, such as, for example, the supply connection, of the auxiliary supply connection, the return connection and the feedback connection being hydraulically connected to counter-connections on the vehicle.

The disclosure is explained in greater detail below with reference to the appended drawings. In this case, components which correspond or are comparable with regard to their function are denoted with the same reference numerals. Other features and aspects will become apparent by consideration of the detailed description, claims, and accompanying drawings.

BRIEF DESCRIPTION OF THE DRAWINGS

The detailed description of the drawings refers to the accompanying figures.

DETAILED DESCRIPTION

Figure 1:
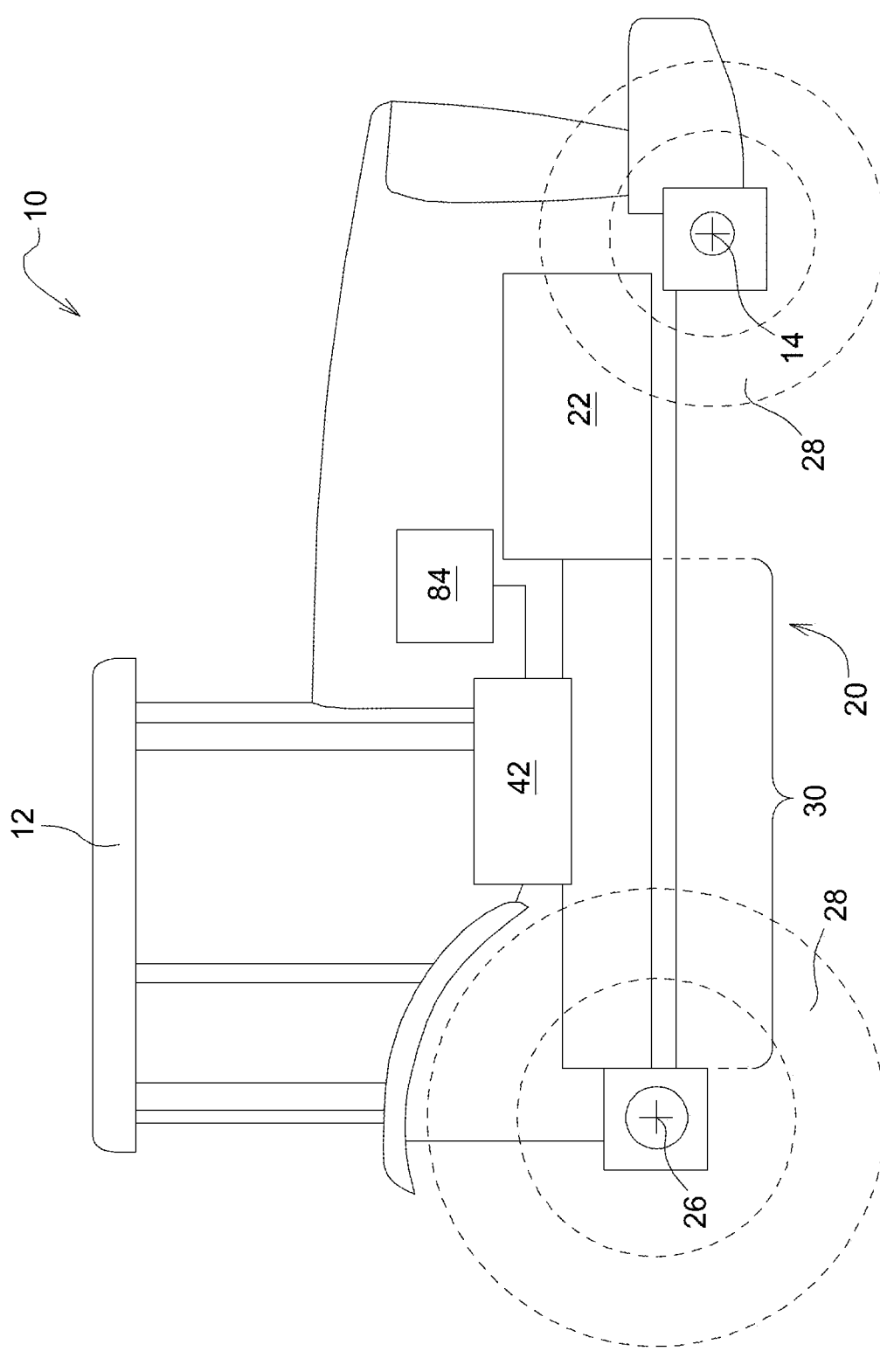
FIG. 1 shows a schematic illustration of a utility vehicle according to the disclosure.

FIG. 1 shows a schematic illustration of an agricultural utility vehicle 10 according to the disclosure, for example in the form of a tractor, having a drive train 20. The utility vehicle 10 further comprises a cab 12, a front vehicle axle 14 and a rear vehicle axle 26. The utility vehicle 10 can have one or more ground engaging means in the form of wheels 28. The drive train 20 comprises a drive motor 22 which may be in the form of an internal combustion engine and a gear mechanism structure 30 which may be composed of different individual gear mechanism components.

The utility vehicle 10 has a hydraulic arrangement 42 having a pump unit 40. According to FIG. 2, the drive motor 22 can drive the gear mechanism structure 30 which drives a displacement pump 46 of the pump unit 40 via a gear mechanism component and a pump drive shaft 44. The hydraulic arrangement 42 may be integrated in the utility vehicle 10 in a modular manner. A modular installation of the hydraulic arrangement 42 in the utility vehicle 10 can be supported by different hydraulic interfaces. A supply connection 48, a return connection 50, an auxiliary supply connection 52 and a return connection 92 can act as such interfaces.

Figure 2:
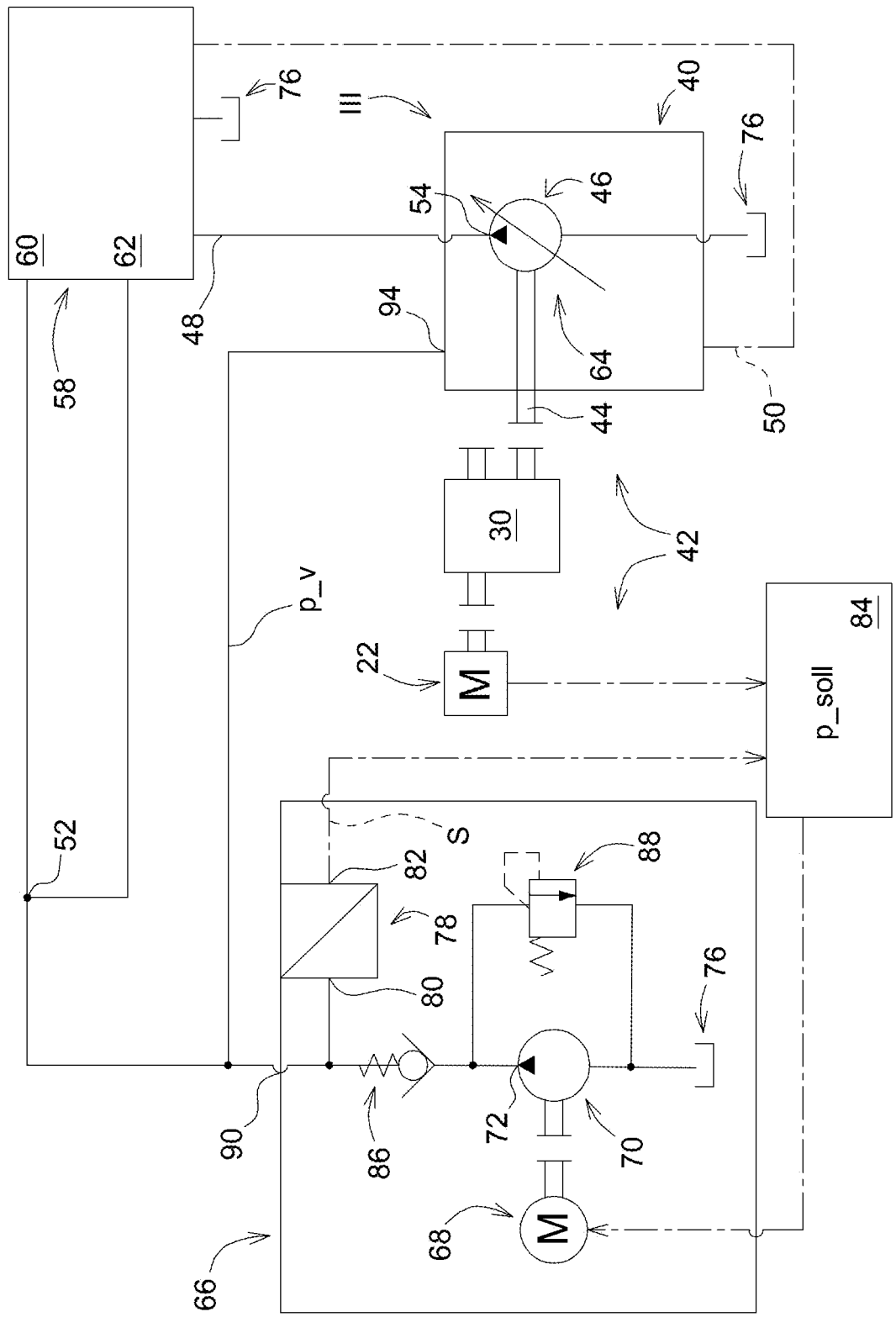
FIG. 2 shows a hydraulic circuit diagram with the hydraulic arrangement according to the disclosure in one embodiment.

According to FIG. 2, a pump output 54 of the pump unit 40 is connected to the supply connection 48 in order to supply hydraulic consumers 58 of the utility vehicle 10. The consumers 58 include inter alia a steering system 60 and a brake system 62. A displacement control unit 64 for displacing the displacement pump 46 is dependent on an output pressure of an auxiliary pump unit 66. This output pressure may be referred to as the displacement pressure $p\_v$ for influencing the displacement control unit 64.

The auxiliary pump unit 66 which acts as a component of the hydraulic arrangement 42 contains an auxiliary pump 70 which is driven by an auxiliary pump motor 68 (for example, electric motor). The auxiliary pump output 72 thereof is hydraulically connected to the auxiliary supply connection 52. Via the auxiliary pump unit 66, hydraulic consumers, for example the steering system 60 and the brake system 62, which are important in technical driving terms in the event of a failure of the pump unit 40, can be alternatively supplied in the manner of emergency operation.

At the input side, the displacement pump 46 and the auxiliary pump 70 are each connected to a tank container or hydraulic tank 76. The hydraulic medium which is conveyed to the consumers 58 flows via return lines back into the hydraulic tank 76.

The above-mentioned hydraulic interfaces-supply connection 48, feedback connection 50, auxiliary supply connection 52, return connection 92—of the hydraulic arrangement 42 can be arranged, for example, directly on or in the pump unit 40 or auxiliary pump unit 66, or be arranged with spacing from the pump unit 40 or auxiliary pump unit 66 by means of a line-like extension.

A pressure sensor 78 with a pressure input 80 is connected to the auxiliary pump output 72. A signal output 82 of the pressure sensor 78 is connected to an electrical control unit 84 (e.g., a controller including a processor and memory) which processes inter alia the output signals or sensor signals S of the pressure sensor 78. In this manner, the control unit 84 can detect the current pressure which is applied to the auxiliary pump output 72 or the current displacement pressure p_v. In accordance with this pressure detection, the control unit 84 can inter alia control the auxiliary pump motor 68.

In order to support the operation of the hydraulic arrangement 42, a hydraulic non-return valve 86 is interposed between the auxiliary pump output 72 and an output 90 of the auxiliary pump unit 66. Furthermore, the auxiliary pump 70 is combined with a hydraulic pressure limiting valve 88.

Figure 3A:
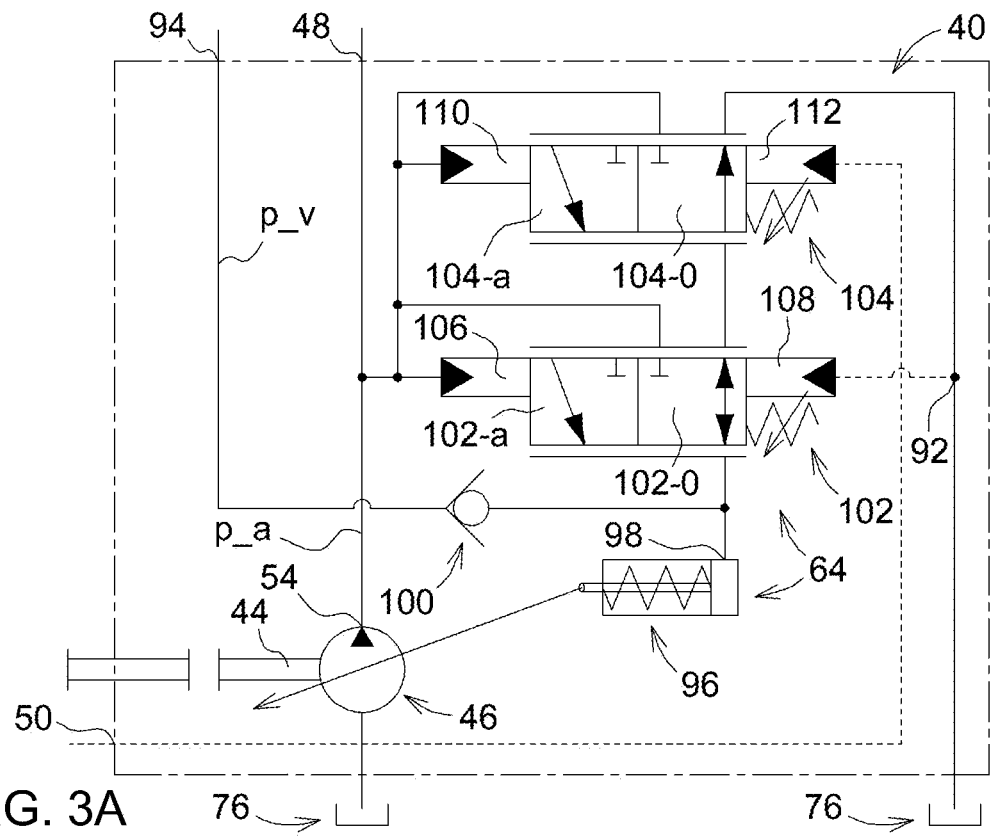
FIG. 3a shows a hydraulic circuit diagram of the detail III within the hydraulic arrangement according to FIG. 2 in a first embodiment.
Figure 3B:
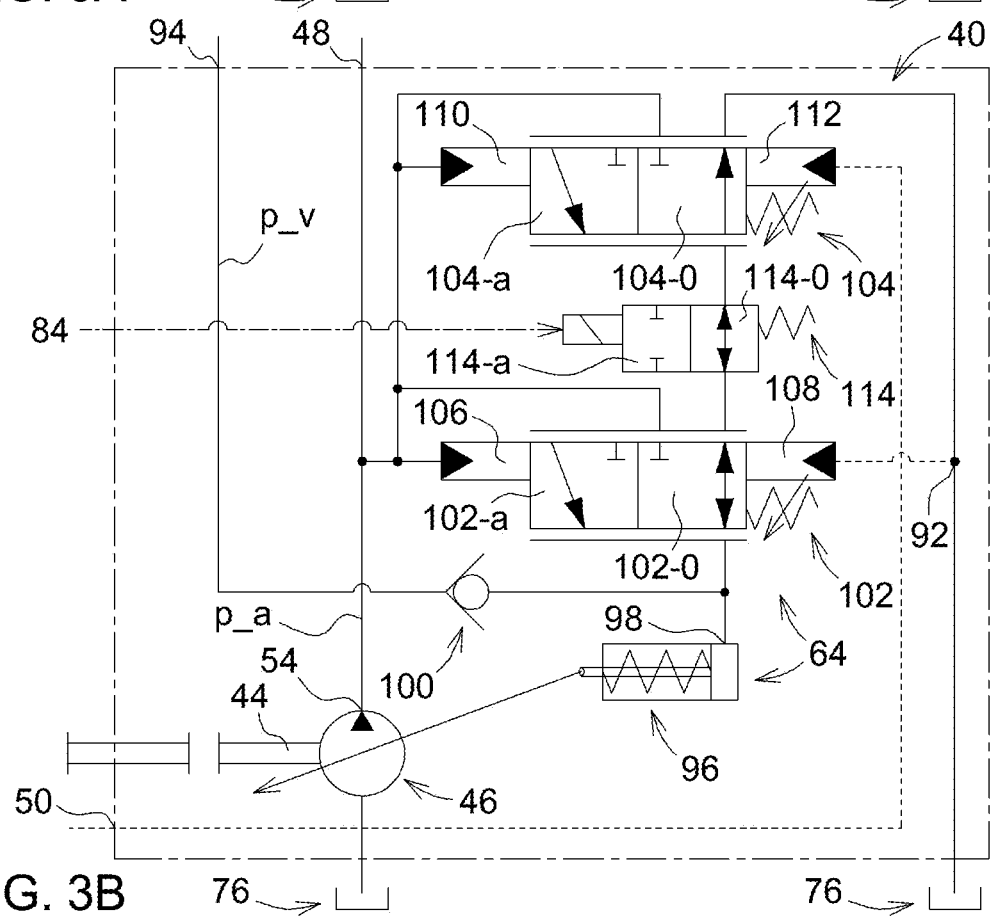
FIG. 3b shows a hydraulic circuit diagram of the detail III within the hydraulic arrangement according to FIG. 2 in another embodiment.
Figure 3C:
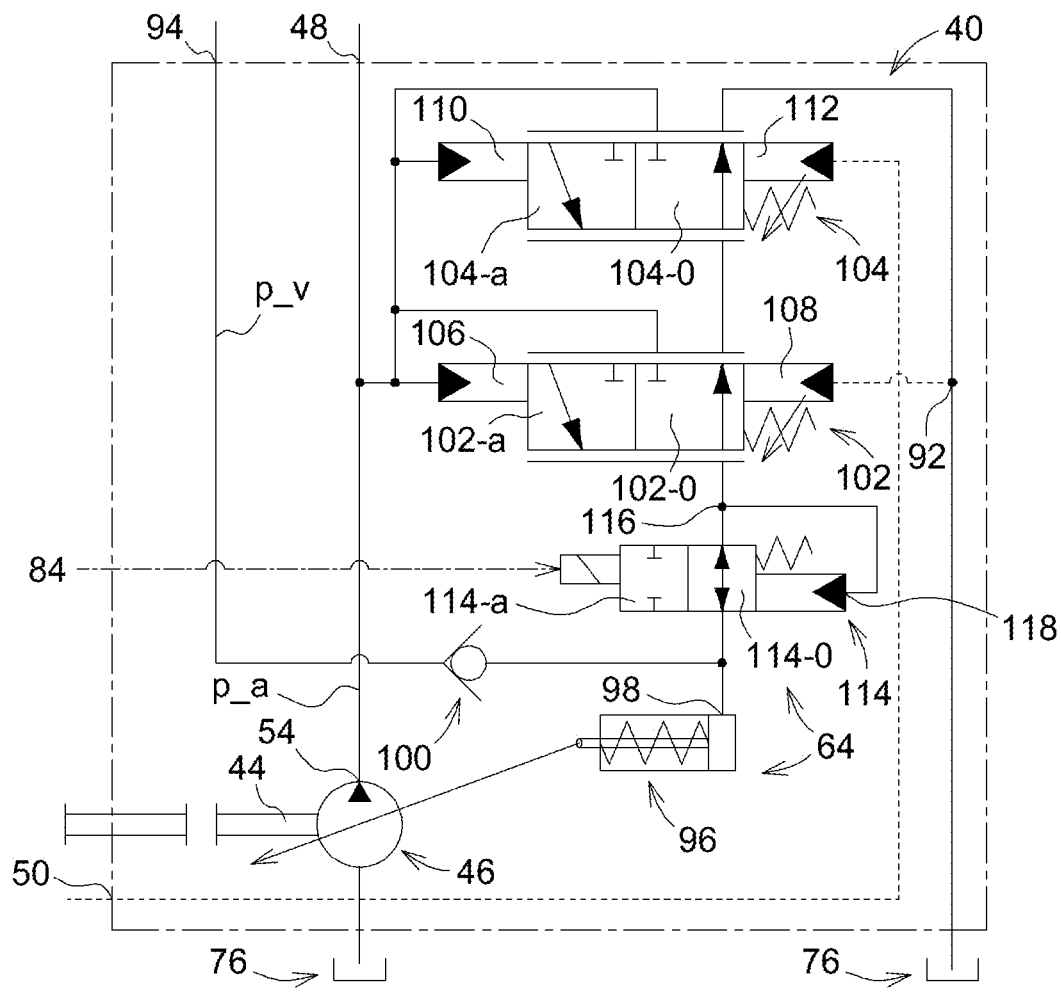
FIG. 3c shows a hydraulic circuit diagram of the detail III within the hydraulic arrangement according to FIG. 2 in another embodiment.

FIG. 3a, FIG. 3b and FIG. 3c show the pump unit 40 with different embodiments of the displacement control unit 64. As can also be seen with reference to FIG. 2, in all the embodiments the auxiliary pump output 72 or the output 90 of the auxiliary pump unit 66 is hydraulically connected to a pressure connection 94 of the pump unit 40.

The displacement control unit 64 has a single-acting displacement cylinder 96. A working connection 98 of the displacement cylinder 96 is hydraulically connected to the output 90 or the auxiliary pump output 72 via the pressure connection 94. A check valve 100 is connected upstream of the working connection 98 in the throughflow path between the output 90 and the working connection 98. In this case, the throughflow direction of the check valve 100 is orientated in the direction of the working connection 98.

In the pump unit 40 according to FIG. 3a, two valve units 102, 104 each having two different switching positions 102-0, 102-a or 104-0, 104-a are hydraulically connected in the throughflow path between the working connection 98, on the one hand, and the return connection 92 and the pump output 54, on the other hand. In this case, the working connection 98 can be connected to the return connection 92 in the switching position 102-0 which forms the rest position, wherein this connection is dependent on the activated rest position 104-0 of the valve unit 104. In a second switching position 102-a of the valve unit 102, the working connection 98 is hydraulically connected to the pump output 54.

The two valve units 102, 104 can each be in the form of a distributing valve or proportional valve with intermediate positions and the two above-mentioned switching positions 102-0, 102-a or 104-0, 104-a as end positions.

The valve units 102, 104 each have two hydraulic control inputs which are opposite each other in a switching direction. A first control input 106 or 110 is hydraulically connected to the pump output 54 of the displacement pump 46 while a second control input 108 of the valve unit 102 is hydraulically connected to the return connection 92 and a second control input 112 of the valve unit 104 is hydraulically connected to the feedback connection 50.

The embodiment according to FIG. 3b differs from the variant according to FIG. 3a substantially in that a retention valve unit 114 having two different switching positions 114-0, 114-a is hydraulically connected in the hydraulic throughflow path between the working connection 98, on the one hand, and the return connection 92 and the pump output 54, on the other hand. The retention valve unit 114 is arranged in the throughflow path between the two valve units 102, 104. In accordance with the activated switching position 114-0 or 114-a thereof, the retention valve unit 114 acts either as a hydraulic connection (with the rest position or switching position 114-0 being activated) or as a hydraulic interruption (with the switching position 114-a being activated) in the throughflow path. The retention valve unit 114 can be electrically actuated by means of the control unit 84 in order to activate or deactivate the different switching positions 114-0, 114-a thereof.

The embodiment according to FIG. 3c differs from the variant according to FIG. 3b substantially as a result of another arrangement of the retention valve unit 114 in the throughflow path and a different construction of the retention valve unit 114. In FIG. 3c, the retention valve unit 114 has, in the throughflow path at the connection side thereof facing away from the working connection 98 of the displacement cylinder 96, a hydraulic valve connection 116 which can be connected to the pump output 54 by means of the valve unit 102 in accordance with an output pressure p_a of the displacement pump 46. A control pressure input 118, which is active in a switching direction, of the retention valve unit 114 is hydraulically connected to the valve connection 116.

By means of the hydraulic logic unit described, the start phase of the drive motor 22 can be supported with a relatively small energy consumption and low energy losses, which affords potential technical advantages for example in the event of a cold start.

Before the utility vehicle 10 is started, the displacement control unit 64, for example the displacement cylinder 96 thereof, is generally adjusted to a conveying position for an increased conveying quantity as a result of the pressure relationships at the pump output 54, at the feedback connection 50 and at the return connection 92. However, one potential advantage of some embodiments is to keep the power consumption of the displacement pump 46 lower in the start phase of the utility vehicle 10 and consequently to adjust the displacement control unit 64 to a conveying position for a reduced conveying quantity. This may be achieved with the hydraulic arrangements 42 according to FIG. 3a, FIG. 3b and FIG. 3c.

In the hydraulic arrangement 42 according to FIG. 3a, an intended start of the drive motor 22 by the control unit 84 (for example, via received bus signals of a vehicle bus, such as, for example, ISO, CAN) is detected from the rest positions or first switching positions 102-0, 104-0 of the valve units 102, 104, with the control unit subsequently activating the auxiliary pump motor 68 so that the auxiliary pump 70 is driven while the displacement pump 46 is stopped. As soon as the displacement pressure p_v which increases at the working connection 98 has reached or exceeded a predetermined desired pressure p_soll—depending on the system of the displacement control unit 64 for example less than 10 bar—the displacement control unit 64 is in the reduced conveying position thereof so that the displacement pump 46 (in the case of the operation thereof) has no power consumption or has only a low power consumption. The power consumption of the displacement pump 46 in the start phase of the utility vehicle 10 can thereby be significantly reduced, whereby the load on the drive motor 22 and the starter motor thereof is relieved in the start phase.

Since the displacement pressure p_v is continuously detected by means of the pressure sensor 78, the control unit 84 can control the hydraulic arrangement 42 in the desired manner after reaching or exceeding the predetermined desired pressure p_soll. For example, after reaching or exceeding the predetermined desired pressure p_soll, the drive motor 22 is started and the displacement pump 46 is driven with a low or reduced power consumption. The auxiliary pump motor 68 can be reduced with respect to the drive power thereof or switched off again. The valve unit 102 can cause the displacement cylinder 96 to automatically adjust the conveying position with a reduced conveying quantity when an increased output pressure p_a (in some examples including a maximum output pressure) is reached at the driven displacement pump 46.

The hydraulic arrangement 42 according to FIG. 3b operates unlike the embodiment according to FIG. 3a additionally with the retention valve unit 114. In the event of an intended start of the drive motor 22, the hydraulic arrangement 42 according to FIG. 3b, for example the auxiliary pump motor 68, is controlled in principle in the same way as in the variant according to FIG. 3a. In addition, the control unit 84 activates at the retention valve unit 114 the switching position 114-a thereof which acts as an interruption. Pressure losses at the working connection 98 as a result of any leaks can thereby be avoided with increasing displacement pressure p_v. At or after the start of the drive motor 22, the retention valve unit 114 can again be moved into the rest position or switching position 114-0 thereof which acts as a hydraulic connection. If the retention valve unit 114 is moved by the control unit 84 in a delayed manner into the rest position or switching position 114-0 thereof which acts as a hydraulic connection, the output pressure p_a increases further or perceptibly. In order to take this circumstance into account, therefore, the conveying position with a reduced conveying quantity is automatically adjusted again at the displacement pump 46 when the increased output pressure p_a is reached at the driven displacement pump 46 by the valve unit 102.

The retention valve unit 114 used to protect against any leaks according to FIG. 3c is, unlike the variant according to FIG. 3b, provided with the control pressure input 118. In the event that the retention valve unit 114 is moved by the control unit 84 in a delayed manner into the rest position or switching position 114-0 thereof which acts as a hydraulic connection, the output pressure p_a also increases further or perceptibly in this case. It becomes possible via the control pressure input 118 for the retention valve unit 114 to be moved into the rest position or switching position 114-0 which acts as a hydraulic connection when the increased output pressure p_a is reached at the driven displacement pump 46. The conveying position with a reduced conveying quantity can thereby be automatically adjusted via the displacement cylinder 96.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and" or "or") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" may be understood by those of ordinary skill to refer to reasonable ranges outside of a given value or orientation, for example, general tolerances or positional relationships associated with manufacturing, assembly, and use of the described embodiments.

Any advantages described herein need not be achieved by every embodiment or example of the disclosure.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A hydraulic arrangement for a utility vehicle, the hydraulic arrangement comprising:
    a hydraulic displacement pump which is connected via a pump output to a supply connection as a hydraulic interface for supplying hydraulic consumers of the utility vehicle;
    a hydraulic auxiliary pump and an auxiliary supply connection as a hydraulic interface for alternatively supplying at least some of the consumers;
    a displacement control unit which is dependent on an output pressure of the auxiliary pump for displacing the displacement pump in such a manner that a hydraulic working connection of a displacement cylinder of the displacement control unit is connected to an output of the auxiliary pump; and
    a retention valve unit which has two different switching positions being hydraulically connected in a throughflow path between the working connection of the displacement cylinder and a return connection and the pump output in such a manner that the retention valve unit acts as a hydraulic interruption or as a hydraulic connection in the throughflow path depending on the activated switching position thereof;
    wherein the retention valve unit has, in the throughflow path at the connection side thereof facing away from the working connection of the displacement cylinder, a hydraulic valve connection which can be connected to the pump output in accordance with an output pressure of the displacement pump.

2. The hydraulic arrangement of claim 1, wherein the displacement cylinder includes a single-acting displacement cylinder.

3. The hydraulic arrangement of claim 1, wherein a non-return valve is hydraulically connected upstream of the working connection in the throughflow path between the output of the auxiliary pump and the working connection of the displacement cylinder, wherein a throughflow direction of the non-return valve is orientated in the direction of the working connection.

4. The hydraulic arrangement of claim 1, wherein the retention valve unit has a control pressure input which is active in a switching direction and which is hydraulically connected to the valve connection.

5. The hydraulic arrangement of claim 1, wherein at least one valve unit which has a plurality of switching positions and which has two hydraulic control inputs which are opposite each other in a switching direction is arranged in the throughflow path between the working connection or the retention valve unit, on the one hand, and a return connection and the pump output, on the other hand, wherein one of the two hydraulic control inputs is hydraulically connected to the pump output and the other of the two hydraulic control inputs is either hydraulically connected to the return connection or is hydraulically connected to a feedback connection which acts as an interface for a pressure feedback of consumers.

6. The hydraulic arrangement of claim 1, wherein the hydraulic arrangement has at least one of the following features with an increasing output pressure at the output of the auxiliary pump after reaching or exceeding a predetermined desired pressure at the output of the auxiliary pump:
the retention valve unit is in the switching position thereof which acts as a hydraulic connection in the throughflow path,
a drive of the auxiliary pump is reduced or deactivated, or
the displacement pump is driven.

7. The hydraulic arrangement of claim 1, wherein a pressure sensor which generates sensor signals is hydraulically connected to the output of the auxiliary pump, wherein in accordance with the sensor signals at least one of 1) a drive of the auxiliary pump can be controlled or 2) the retention valve unit can be controlled in order to change the switching position thereof.

8. A utility vehicle, comprising:
a drive motor; and
a hydraulic arrangement including:
a hydraulic displacement pump which is connected via a pump output to a supply connection as a hydraulic interface for supplying hydraulic consumers of the utility vehicle;
a hydraulic auxiliary pump and an auxiliary supply connection as a hydraulic interface for alternatively supplying at least some of the consumers;
a displacement control unit which is dependent on an output pressure of the auxiliary pump for displacing the displacement pump in such a manner that a hydraulic working connection of a displacement cylinder of the displacement control unit is connected to an output of the auxiliary pump; and
a pressure sensor which generates sensor signals being hydraulically connected to the output of the auxiliary pump, wherein in accordance with the sensor signals at least one of 1) a drive of the auxiliary pump can be controlled or 2) a retention valve unit can be controlled in order to change a switching position thereof.

9. The utility vehicle of claim 8, wherein the drive motor is drivingly connected to the displacement pump.

10. The utility vehicle of claim 8, wherein the auxiliary supply connection is hydraulically connected to at least one of a brake system or a steering system of the utility vehicle.

11. A hydraulic arrangement for a utility vehicle, the hydraulic arrangement comprising:
a hydraulic displacement pump which is connected via a pump output to a supply connection as a hydraulic interface for supplying hydraulic consumers of the utility vehicle;
a hydraulic auxiliary pump and an auxiliary supply connection as a hydraulic interface for alternatively supplying at least some of the consumers;
a displacement control unit which is dependent on an output pressure of the auxiliary pump for displacing the displacement pump in such a manner that a hydraulic working connection of a displacement cylinder of the displacement control unit is connected to an output of the auxiliary pump; and
a pressure sensor which generates sensor signals being hydraulically connected to the output of the auxiliary pump, wherein in accordance with the sensor signals at least one of 1) a drive of the auxiliary pump can be controlled or 2) a retention valve unit can be controlled in order to change a switching position thereof.

* * * * *